United States Patent [19]

Molinaro

[11] Patent Number: 4,722,539
[45] Date of Patent: Feb. 2, 1988

[54] USER-CONTROLLABLE SINGLE RUNNER SKI

[76] Inventor: Samuel Molinaro, 173 St. James Dr., Santa Rosa, Calif. 95401

[21] Appl. No.: 917,300

[22] Filed: Oct. 9, 1986

Related U.S. Application Data

[63] Continuation of Ser. No. 695,290, Jan. 28, 1985.

[51] Int. Cl.$^4$ .............................................. A63C 5/00
[52] U.S. Cl. ................... 280/12 K; 280/609; D12/9; D12/10
[58] Field of Search ............. 280/12 K, 12 H, 12 KL, 280/609, 610, 611; D12/6, 8, 9, 10, 11; D21/229

[56] References Cited

U.S. PATENT DOCUMENTS

| D. 232,164 | 7/1974 | Bemis, II et al. | 280/12 K |
|---|---|---|---|
| 1,954,830 | 4/1934 | Richards | 280/12 K |
| 3,003,778 | 10/1961 | Taggart | 280/12 K |
| 3,139,287 | 6/1962 | Annis | 280/12 AB |
| 3,195,889 | 2/1962 | Hall | 280/610 |
| 3,297,334 | 1/1967 | Jenks | 280/12 K |
| 3,325,179 | 6/1967 | Bissett | 280/12 K |
| 3,628,804 | 12/1971 | Carreiro | 280/609 |
| 3,635,483 | 1/1972 | Barriball et al. | 280/610 |
| 3,744,811 | 7/1973 | Johnston | 280/12 K |
| 3,778,077 | 12/1973 | Johnson | 280/12 K |
| 3,830,513 | 8/1974 | Hunt | 280/12 K |
| 4,094,528 | 6/1978 | Cluzel | 280/610 |
| 4,199,162 | 4/1980 | Joy | 280/12 K |
| 4,491,333 | 1/1985 | Warnke | 280/28 |

FOREIGN PATENT DOCUMENTS

| 2435956 | 5/1980 | France | 280/12 H |
|---|---|---|---|
| 2437850 | 6/1980 | France | 280/12 H |
| 206872 | 8/1939 | Switzerland | 280/12 K |
| 389420 | 7/1965 | Switzerland | 280/12 K |

Primary Examiner—John J. Love
Assistant Examiner—Eric Culbreth
Attorney, Agent, or Firm—Schapp and Hatch

[57] ABSTRACT

A single runner sled having an elongated runner having a straight medial portion curving upwardly at both the front and rear ends and curving upwardly along the sides of the runner so that shifting the weight of the user from side to side on the pedestal supported seat controls the direction of travel of the runner, the rear end of the runner being curved upwardly higher than the front end of the runner and the seat being located near the rear end so that the unit may be rocked back on the rear end when controlling the speed of travel of the sled by engagement of the feet of the user with the snow over which the sled is traveling. A reinforcing or rubbing strip may be mounted along the flat portion of the bottom of the runner.

1 Claim, 4 Drawing Figures

USER-CONTROLLABLE SINGLE RUNNER SKI

This is a continuation of co-pending application Ser. No. 695,290 filed on Jan. 28, 1985.

BACKGROUND OF THE INVENTION

1. Field of the Invention

This invention relates to single runner sleds of the type sometimes referred to as ski-sleds in which the user sits upon a seat supported above the runner on a column or pedestal.

2. Description of the Prior Art (The term "prior art" as used herein, or in any statement by or on behalf of applicant, means only that any document or thing referred to as prior art bears, directly or inferentially, a date which is earlier than the effective filing date hereof.)

Single runner ski sleds have heretofore been provided in a variety of configurations, mostly having to do with the configuration of the seat. The user is expected to sit upon the seat and control the direction and speed of the device by extending his legs on opposite sides of the runner and selectively engaging his feet with the surface of the snow. Generally, the runners resemble skis, hence the appellation ski-sled.

Typical of such ski-sleds are the devices disclosed in the following patents:

U.S. Pat. No. 3,003,778 to Taggart
U.S. Pat. No. 3,297,334 to Jenks
U.S. Pat. No. 3,325,179 to Bissett
U.S. Pat. No. 3,744,811 to Johnston
U.S. Pat. No. 3,778,077 to Johnson
U.S. Pat. No. 4,199,162 to Joy Each of the devices disclosed in these patents is characterized by being flat on the bottom from side to side and being flat on the bottom from front to rear except for an upturned front tip portion, all in resemblance to a conventional ski. The earliest single runner sleds having an elevated seat were barrel staves upon which were mounted a vertical post and a cross member to serve as a seat. Such a device is shown in U.S. Pat. No. 3,830,513 to Hunt. In this patent, the bottom surface of the runner is somewhat curved from front to rear, although nearly flat in the rear portion, and is definitely flat from side to side throughout its entire length.

It is believed that the patents listed above contain information which is or might be considered to be material to the examination of this application, and these patents are believed to be relevant to the present invention because they were adduced by a prior art search made by an independent searcher.

A copy of each of the above-listed patents is supplied to the Patent and Trademark Office herewith.

No representation or admission is made that any of the above-listed documents is part of the prior art, in any acceptation of that term, or that no more pertinent information exists.

SUMMARY OF THE INVENTION

I have found that a single runner sled having a seat supported upon a pedestal can be much more readily controlled by the user than can the devices shown in the above cited patents. To this end, I form the singly elongated runner with upwardly curving ends at both the front and the rear. The medial portion between these ends is substantially flat in a fore and aft direction. The bottom of the runner has upwardly curving sides and a flat medial portion when viewed in cross section, this configuration running substantially the entire length of the runner. The upward curvature of the sides of the runner bottom and the upward curvature of both the front and rear ends thereof greatly increase the controllability of direction of the device by a user perched upon the pedestal supported seat. The pedestal extends upwardly from the rear end of the flat portion of the runner by a distance approximating the length of such flat portion. In order to cause the device to curve to one side or the other, the user simply leans his weight to the desired side. This cants the runner onto one or the other of its curving edges and the curvature of the front and rear ends of the runner causes it to turn in the direction toward which it is canted. Shifting of the user's weight back to the original balance point levels the runner, causing the single runner sled of the present invention to resume a straight track.

Control over the tilt of the seat and pedestal, and hence the cant of the runner, is facilitated by forming elongated openings in the seat adjacent to its ends so as to provide the handles which the user can grip. The runner, and indeed the entire device, may be fabricated of wood, metal or plastic. Where wood or plastic is used in the runner, a reinforcing snow-engaging strip is provided along the bottom of the runner.

It is therefore an object of the present invention to provide a user-controllable single runner sled which is maneuverable as to direction by simple shifting of the weight of the user from side to side.

Another object of the present invention is to provide a user-controllable single runner sled of the character described in which the bottom configuration of the runner curves upwardly at front and rear and along the sides of the runner.

A further object of the present invention is to provide a single runner sled of the character described which also tends to track in a substantially straight line when the weight of the user is balanced on the seat.

Other objects and features of advantage will become apparent as the specification progresses and from the claims.

Figure 1:
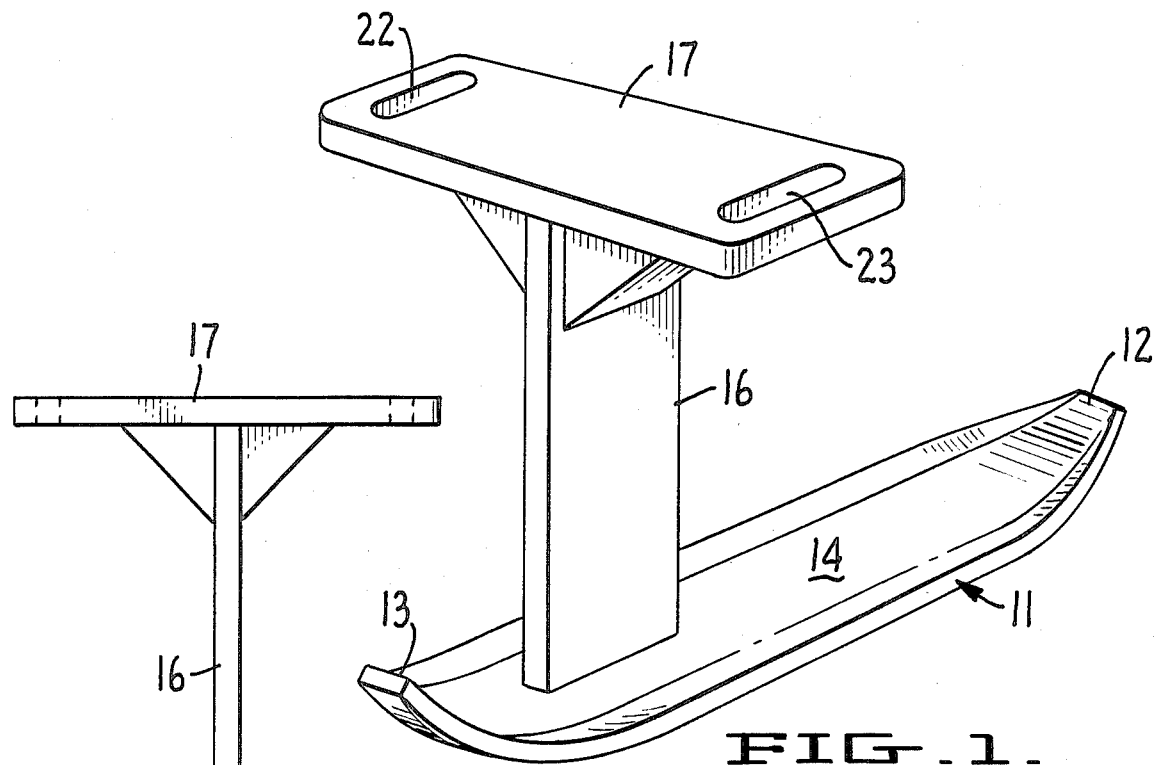
FIG. 1 is a perspective view of a user-controllable single runner sled constructed in accordance with the present invention.

While only the preferred form of the invention is illustrated in the drawings, it will be apparent that various modifications could be made without departing from the ambit of the claims.

DESCRIPTION OF THE PREFERRED EMBODIMENT

As may be seen in the accompanying drawings, the user-controllable single runner sled of the present invention provides an elongated runner 11 adapted to slide over the snow and having upwardly curving front and rear ends 12 and 13 joined by a straight medial portion 14, a pedestal 16 secured to the runner 11 at the rear end of the medial portion 14 and extending upwardly by a distance approximating the length of said straight medial portion therefrom, and a seat 17 secured to the upper end of the pedestal 16 and extending transversely of the runner 11.

Figure 3:
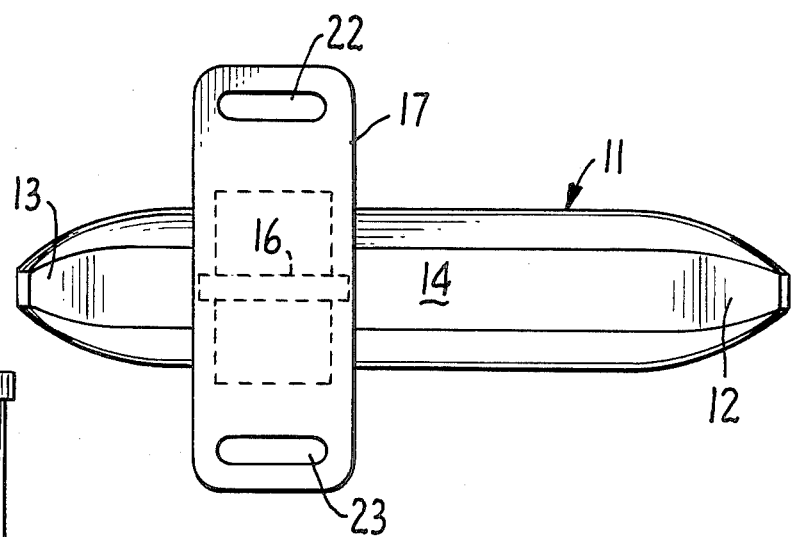
FIG. 3 is a plan view of the user-controllable single runner sled of FIG. 1.

As may best been seen in FIGS. 1 and 3 of the drawings, the front and rear ends 12 and 13, respectively, of the runner 11 preferably have semi-pointed ends, with each such end curving inwardly to what would be a point when viewed from above, such point being cut off here to provide only semi-pointed ends.

Figure 2:
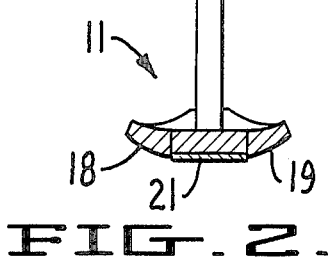
FIG. 2 is a vertical cross sectional view taken substantially on the plane of line 2—2 of FIG. 4.

In accordance with the present invention, the bottom of the runner 11 has upwardly curving sides 18 and 19 along the length thereof so that the bottom of the runner, when viewed in cross section as in FIG. 2 of the drawings, curves upwardly from a flat medial portion. The curvature of ends 12 and 13 cooperates with the curvature of sides 18 and 19 to make it possible to guide the direction of the runner across the snow by shifting the weight of the user from side to side.

A reinforcing wear strip 21 may be fastened along the length of the runner 11 to make the runner stronger and to protect it against forceable contact with rocks, bushes and the like. Desirable, the wear strip 21 is made of a strong, resilient material such as spring steel and may be coated with polytetrafluoroethylene, or the like, in order to reduce frictional contact between the runner 11 and the snow. Where the runner 11 is constructed of metal, or other materials not requiring a reinforcing strip, a rubbing strip of polytetrafluoroethylene plastic may be used.

Figure 4:
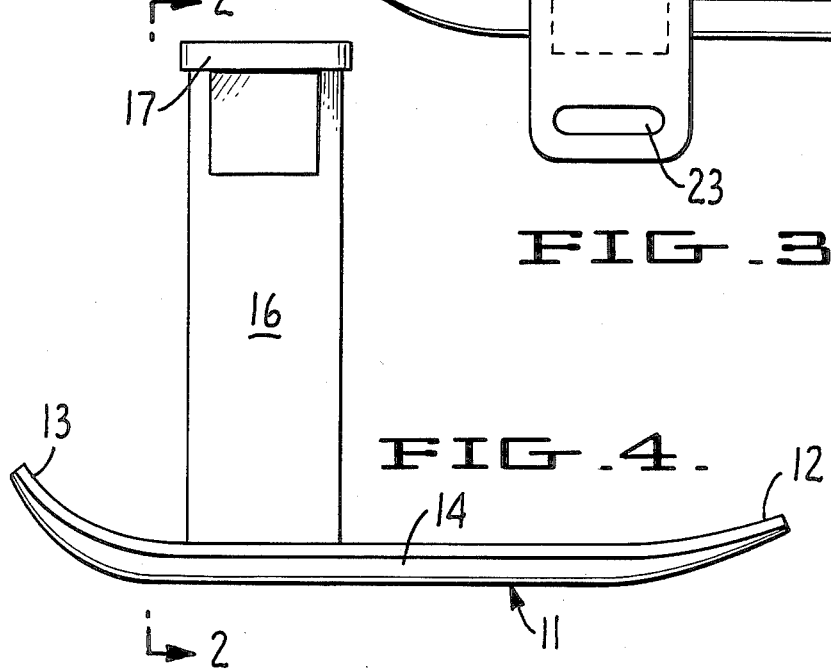
FIG. 4 is a side elevational view of the user-controllable single runner sled of FIG. 3.

As may best be seen in FIG. 4 of the drawings, the rear end 13 of runner 11 curves up somewhat more abruptly and higher than the front end 12. This configuration assists the user in bringing the sled of the present invention to a stop by permitting the user to rock back on the seat 17 as he engages his feet with the snow on the opposite sides of the runner 11. Elongated cut out portions 22 and 23 are formed at the opposite ends of the seat 17 so as to provide handles for the user to grip the seat on either side of the user's body.

From the foregoing, it should be apparent that the user-controllable single runner sled of the present invention is well adapted for furnishing all the enjoyment of a single runner sled in a configuration in which the user can more easily and readily control both the speed and direction of movement of the sled.

What I claim as new and desire to secure by Letters Patent is:

1. A user-controllable single runner sled, comprising:

an elongated runner adapted to slide over the snow and having upwardly curving front and rear ends joined by a straight, flat medial portion together with upwardly curving sides along the length thereof said flat medial portion being bounded by said sides and said upwardly curving front and rear ends, a pedestal secured to said runner at the rear end of said medial portion and extending upwardly therefrom by a distance approximating the length of said straight medial portion, and a seat secured to the upper end of said pedestal and extending transversely of said runner, said runner curving upwardly at its rear end more abruptly than at its front end and terminating higher than the front end.

* * * * *